US008005227B1

(12) United States Patent
Linnell et al.

(10) Patent No.: US 8,005,227 B1
(45) Date of Patent: Aug. 23, 2011

(54) KEY INFORMATION CONSISTENCY CHECKING IN ENCRYPTING DATA STORAGE SYSTEM

(75) Inventors: Thomas Linnell, Northborough, MA (US); Jack Harwood, Paxton, MA (US); John T. Fitzgerald, Mansfield, MA (US)

(73) Assignee: EMC Corporation, Hopkinton, MA (US)

( * ) Notice: Subject to any disclaimer, the term of this patent is extended or adjusted under 35 U.S.C. 154(b) by 847 days.

(21) Appl. No.: 11/964,789

(22) Filed: Dec. 27, 2007

(51) Int. Cl.
*H04L 9/08* (2006.01)

(52) U.S. Cl. ......... 380/279; 380/277; 380/278; 713/190

(58) Field of Classification Search .................. 713/190, 713/189, 176, 177, 168, 170; 380/281, 279, 380/277, 278, 282
See application file for complete search history.

(56) References Cited

U.S. PATENT DOCUMENTS

| | | | | |
|---|---|---|---|---|
| 4,888,800 A * | 12/1989 | Marshall et al. | ............. | 380/281 |
| 5,604,801 A * | 2/1997 | Dolan et al. | .................. | 713/159 |
| 6,947,556 B1 * | 9/2005 | Matyas et al. | .................. | 380/29 |
| 7,055,027 B1 * | 5/2006 | Gunter et al. | ................. | 713/151 |
| 7,165,152 B2 * | 1/2007 | Blumenau et al. | ........... | 711/152 |
| 7,191,344 B2 * | 3/2007 | Lin et al. | ........................ | 713/193 |
| 7,260,636 B2 * | 8/2007 | Blumenau et al. | ........... | 709/227 |
| 7,353,388 B1 * | 4/2008 | Gilman et al. | ................. | 713/168 |
| 7,499,552 B2 * | 3/2009 | Wilt et al. | ...................... | 380/281 |
| 7,774,320 B1 * | 8/2010 | Day et al. | ...................... | 707/690 |
| 2004/0139098 A1 * | 7/2004 | Margolus et al. | ............. | 707/100 |
| 2004/0220932 A1 * | 11/2004 | Seeger et al. | ...................... | 707/8 |
| 2005/0152542 A1 * | 7/2005 | Zheng et al. | ..................... | 380/30 |
| 2006/0080553 A1 * | 4/2006 | Hall | ............................... | 713/189 |
| 2007/0094505 A1 * | 4/2007 | Futa et al. | ....................... | 713/176 |
| 2007/0174362 A1 * | 7/2007 | Pham et al. | .................... | 707/204 |
| 2008/0022356 A1 * | 1/2008 | Tanaka et al. | ...................... | 726/1 |
| 2008/0065882 A1 * | 3/2008 | Goodman et al. | ............ | 713/165 |
| 2008/0219449 A1 * | 9/2008 | Ball et al. | ....................... | 380/277 |
| 2008/0253572 A1 * | 10/2008 | Gassoway | ..................... | 380/278 |
| 2009/0132823 A1 * | 5/2009 | Grimen et al. | ................. | 713/171 |

\* cited by examiner

*Primary Examiner* — Saleh Najjar
*Assistant Examiner* — Eric W Shepperd
(74) *Attorney, Agent, or Firm* — BainwoodHuang (57) ABSTRACT

A data storage system employs data encryption to increase data security, and techniques for ensuring consistency of key information maintained and used throughout the system to reduce the likelihood that data will become non-recoverable due to the use of an incorrect encryption key. In one aspect, a verification process is performed between a key table at a central storage processor and key tables containing decrypted copies of the same information that are stored and utilized at separate input/output (I/O) modules. The verification process includes computing respective hash values at the I/O modules and at the storage processor and comparing the hash values to determine whether they match, a match indicating that the tables are consistent and a non-match indicating that the tables are not consistent. In another aspect, an I/O module performs a check prior to performing an encryption/decryption operation as part of processing an I/O command to ensure that the correct key will be utilized. This check involves comparing address information from the I/O command to address information stored in association with the data encryption key. If the address information is consistent, it indicates that the specified data encryption key is the correct key to be used for the encryption/decryption operation.

15 Claims, 6 Drawing Sheets

KEY INFORMATION CONSISTENCY CHECKING IN ENCRYPTING DATA STORAGE SYSTEM

BACKGROUND

In the field of data storage systems, it has been known to employ data encryption to protect information stored on a magnetic disk or other storage medium. Plaintext data sent by a host computer for storage is encrypted according to an encryption algorithm and a secret encryption key, and the encrypted data is stored on the storage medium. When the data is retrieved later, for example in response to a read command from the host computer, the encrypted data is first read from the storage medium and then decrypted using a decryption algorithm and decryption key which are complementary to the encryption algorithm and encryption key. In many cases the same key can actually serve as both the encryption and decryption key.

Also known in the art are data storage systems of some complexity, especially larger data storage systems and/or systems designed for high availability for demanding application environments, such as on-line transaction processing, etc. These storage systems often employ both a logical as well as a physical view of stored data. In one well-known example, a logical unit of storage is physically stored on a set of physical units using redundant array of inexpensive disks (RAID) techniques. There are a variety of other applications of the logical/physical paradigm as well.

In these kinds of systems it is known to employ a central storage processor (SP) which receives storage commands from a host that are directed to a logical unit of storage, and which translates between the logical view to a physical view according to a RAID algorithm or other algorithm. The storage processor then creates one or more storage commands directed to the corresponding physical units of storage, and forwards these commands to one or more hardware input/output (I/O) modules.

The I/O modules in turn are responsible for carrying out the physical-level storage commands in conjunction with individual disk drive devices coupled to the I/O module. In the case of read commands, the central storage processor is responsible for receiving the data from each of the physical-level read commands and creating the logical-level read response according to the RAID or other algorithm it utilizes. The storage processor and I/O modules operate together in a coordinated and coherent fashion, each I/O module maintaining local information necessary to its operations but also linked in a consistent manner with information at the SP so that commands and data can be correctly handed off from one device to another in the course of the overall processing of an I/O command.

SUMMARY

The present disclosure is generally directed to a data storage system that employs data encryption for enhanced data security and also has a structure in which the overall processing of an I/O command is performed by multiple relatively independent modules of the system in a coordinated fashion. It is also directed to maintaining data integrity in such a system, so that the system can be utilized in demanding applications.

One of the challenges of employing data encryption in a data storage system is that the encryption process alters data beyond casual recognition—once encrypted, the original data can only be recovered by using the proper decryption algorithm and key. Thus, if the key information somehow becomes inconsistent within the system, it may be impossible to recover stored data—the system may attempt to use the wrong key for either encryption or decryption. Additionally, in a data storage application there could be considerable time between the encryption and decryption operations, which correspond to write and read operations respectively, and thus there may be a chance of inconsistency developing during an extended operating period of the storage system.

Therefore, the present disclosure is directed to the need to ensure that data encryption key information is distributed and utilized consistently in a data storage system to avoid the potentially severe problems that could arise if the key information were to become inconsistent, such as the inability to recover encrypted data. In particular, the present disclosure includes a technique for checking for consistency of key information before performing encryption or decryption as part of carrying out an encrypted storage command, thus reducing the chances of rendering data unusable through use of an erroneous data encryption key.

According to one aspect, the disclosed data storage system checks for consistency between a data structure storing a data encryption key for a storage object and data of an I/O command directed to the storage object. A data structure is maintained that includes key entries, each including data items for a respective storage object of the data storage system which is a unit of encrypted data storage. The data items of each key entry include (1) a data encryption key used in encryption/decryption operations on the storage object, and (2) address information specifying a storage device and a location of the storage device where encrypted data of the storage object is stored. In one embodiment a local key table is maintained on an I/O module connected to a storage processor of a data storage system which is responsible for forming I/O commands and forwarding them to the I/O module to be carried out. The entries of the key table are local copies of key information also maintained centrally at the storage processor.

In response to an input/output (I/O) command for an encrypted data storage operation using a target key entry specified in the I/O command, a comparison is made between I/O command address information included with the I/O command and the address information of the target key entry. If the comparison indicates that the I/O command address information is consistent with the address information of the target key entry, then the data storage system proceeds with the encrypted data storage operation, having greater confidence that the correct key is being specified for use in the encryption/decryption. If the comparison indicates that the I/O command address information is not consistent with the address information of the target key entry, then the encrypted data storage operation is aborted, due to the decreased confidence that the correct key is being specified for use because of the inconsistency of the address information.

In another aspect, the disclosed data storage system explicitly checks for consistency between a centrally maintained data structure of key information (such as at a storage processor) and copies of the key information maintained at "encryption endpoints", such as I/O modules, that perform encryption/decryption as part of carrying out an I/O command. A central data structure such as a central key table is maintained which contains wrapped key entries, each being uniquely associated with a corresponding one of encryption endpoints at which the encrypted data storage operations are performed. Each wrapped key entry includes (1) a wrapped key with data items encrypted together according to a key encryption operation specific to the associated encryption endpoint, and (2) a hash value. The data items of the wrapped key include (i) a data encryption key, (ii) storage object information identifying storage data to be encrypted using the data encryption key, and (iii) a key identifier uniquely associated with the data encryption key. The wrapped keys are distributed to the associated encryption endpoints. The hash value is computed from the key identifier prior to being encrypted together with the other data items into the wrapped key.

At each of the encryption endpoints, each of the wrapped keys is decrypted using the key encryption operation of the encryption endpoint, so as to obtain the data encryption key, the storage object information and the key identifier in non-encrypted form. Each encryption endpoint maintains a local data structure including unwrapped key entries each including the data encryption key, the storage object information and the key identifier in non-encrypted form from the corresponding wrapped key. The unwrapped key entries are used by the encryption endpoint to perform the encrypted data storage operations.

A verification operation is performed including (1) computing a first hash value at each of the encryption endpoints, the first hash value being computed from the key identifiers of one or more of the unwrapped key entries of the local data structure, (2) obtaining second hash values, each second hash value being obtained from the hash values of one or more of the wrapped key entries of the central data structure for the associated encryption endpoint, and (3) comparing each first hash value to a corresponding one of the second hash values to determine whether they match. If so, it is an indication that the key information is consistent and may be used for processing I/O commands. If the hash values do not match, it is an indication of inconsistency such that corrective action may be required. As shown more fully below, the verification operation may include either/both of a "full" verification procedure of checking the entirety of either the local data structure or the central data structure, and/or a single-entry verification procedure in which only one key entry is checked for consistency. The former may be useful relatively infrequently, such as during initialization or re-loading, and the latter may be preferred as part of the process of distributing a single key to an I/O module.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
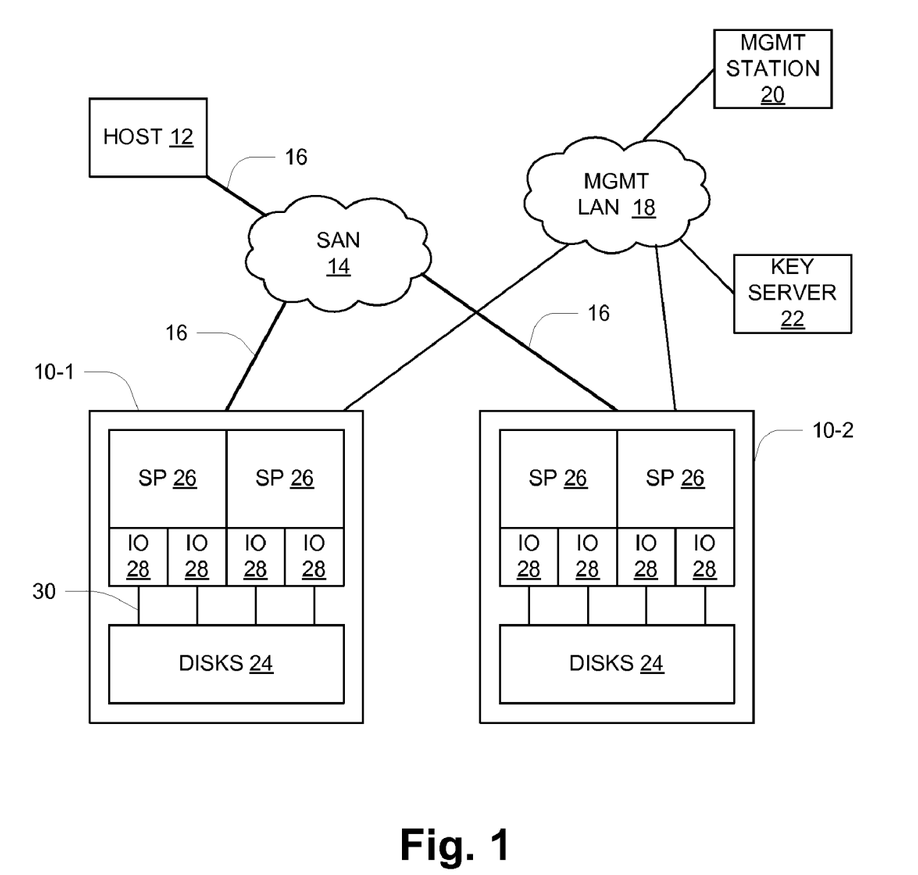
FIG. 1 is a block diagram of a computer system employing encrypted data storage.

FIG. 1 shows a computer system including data storage systems 10 (shown as 10-1 and 10-2) connected to one or more host computers (HOST) 12 by a storage-area network (SAN) 14. The SAN employs high-bandwidth communications links 16 specifically tailored for data storage communications, such as Fiber Channel links. The data storage systems 10 are also connected via a management local-area network (MGMT LAN) 18 to a storage management station (MGMT STATION) 20 and a key server 22. The management LAN 18 generally employs lower-bandwidth links such as 10/100 Mbps Ethernet links, sufficient to carry communications relating to configuration and operational monitoring and control of the data storage systems 10.

As shown, the data storage systems 10 each contain a plurality of data storage devices shown as disks 24, accessed by one or more storage processors (SPs) 26 via respective input/output (I/O) modules 28. In one embodiment each disk may have two ports A and B, so that the IO modules 28 on the left and the IO modules 28 on the right connect to the A and B ports of the same set of disks 24, respectively. The connections 30 between the I/O modules 28 and the disks 24 are also storage-oriented connections, such as Fiber Channel or Small Computer Systems Interconnect (SCSI) links for example. The connections between the SPs 26 and the I/O modules 28 are typically high-speed circuit board connections, such as low-voltage differential signaling (LVDS). The I/O modules 28 include specialized interface circuitry (not shown in FIG. 1) for carrying out high-speed data transfer, and also a processor (also not shown) for performing higher-level functions such as described below. The SPs 26 also perform higher-level storage-related functions, including for example redundant array of inexpensive disks (RAID) functions. Beyond RAID, the data storage systems 10 may implement other forms of redundancy to enhance availability as generally known in the art.

As described in more detail below, the data storage systems 10 implement encrypted data storage for purposes of enhanced data security. The host(s) 12 and SAN 14 operate on so-called "plaintext" or unencrypted data which is directly usable by application programs (such as an operating system) executing on the host(s) 12. However, within the data storage systems 10, data is stored in encrypted form on the disks 24, and thus the storage systems 10 perform data encryption and decryption to translate between the plaintext data of the host(s) 12 and SAN 14 and the encrypted data stored on the disks 24. Any of various encryption/decryption processes may be employed, including the various modes of the Advanced Encryption Standard (AES), and using keys of various sizes. The details of the encryption/decryption itself are outside the scope of the present description. The present description is primarily concerned with certain aspects of the distribution and use of the encryption keys which are used by the data storage systems 10 in the encryption and decryption processes.

It should be noted that the arrangement of FIG. 1 may represent a physical partitioning into different physical enclosures, but in alternative embodiments some functions may be physically co-located with others. As an example, in one embodiment the management station 20 and key server 22 may reside in the same physical enclosure. In another embodiment, it may be desirable to incorporate the key server 22 into the same physical enclosure as one of the storage systems 10.

Figure 2:
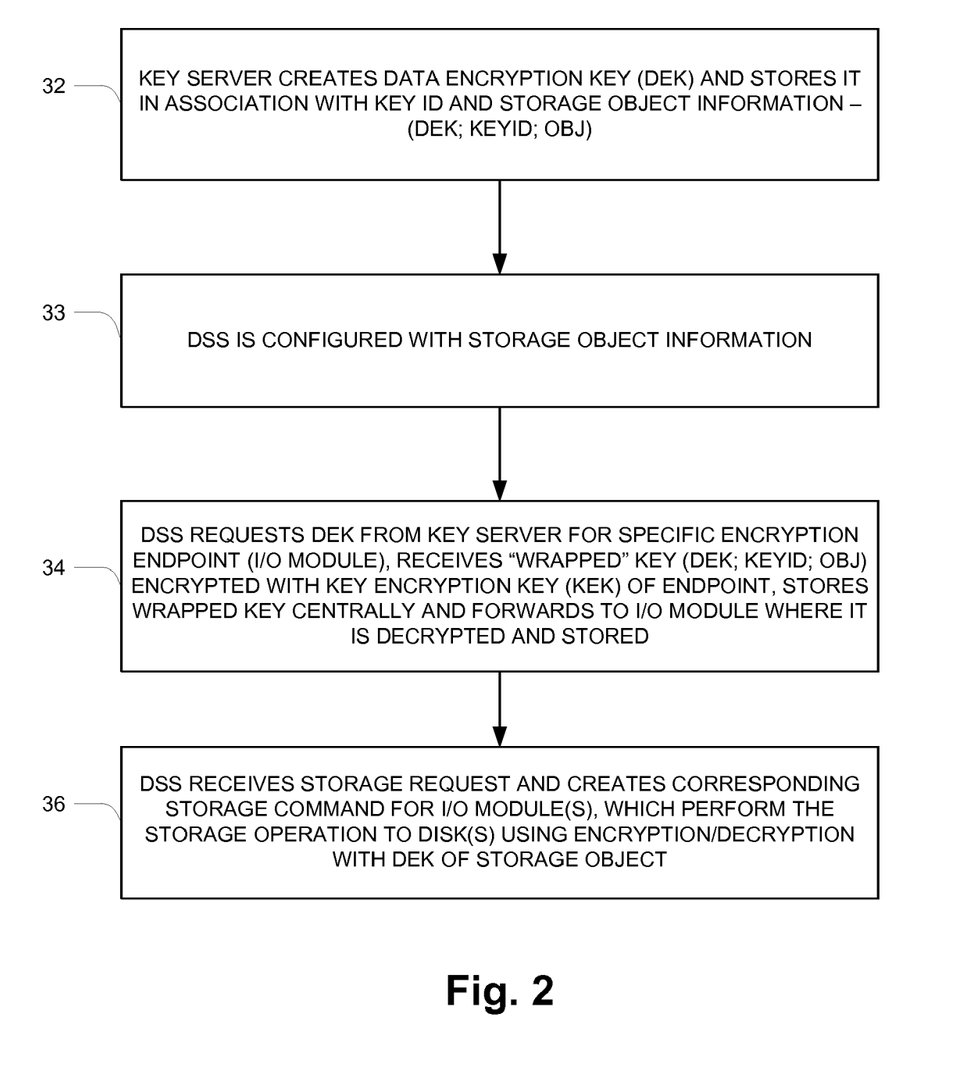
FIG. 2 is a flow diagram depicting high-level operation of the system of FIG. 1.

FIG. 2 is a flowchart depicting the high-level operation of the system of FIG. 1. At 32, the key server 22 creates a data encryption key (DEK) and an associated globally unique key identifier KEYID, and stores these items in association with "storage object" information OBJ (collectively shown in FIG. 2 as a tuplet (DEK; KEYID; OBJ)). In the system of FIG. 1, this action may be taken for example on request of the management station 20 as part of a system configuration operation. The storage object information OBJ in general may be any specification of an area of data storage provided by one of the data storage systems 10, and is typically created by the management station 20 and provided to the key server 22 as part of a key creation request. Generally the storage object information OBJ will include an identifier of a storage device (either logical or physical) and a range of addresses (again either logical or physical). The key server 22 simply stores this storage object information in association with the DEK that it creates, which is to be utilized to encrypt and decrypt the data for the storage object. The key server 22 also includes the storage object information in a "wrapped" key it provides to the data storage systems 10 as described in more detail below.

At 33, a DSS 10 is configured with the storage object information for all storage objects defined at the data storage system 10. In one embodiment, this configuration action is taken by the management station 20. The process of configuring a data storage system with storage object information is generally known in the art.

At 34, a data storage system (DSS) 10 requests from the key server 22 the DEK for a storage object on behalf of a specific "encryption endpoint" at which encryption/decryption operations occur, which in the illustrated embodiment is an I/O module 28 of the requesting data storage system 10. In response, the key server 22 sends to the data storage system 10 a "wrapped" key, which is the tuplet (DEK; KEYID; OBJ) encrypted such that it can only be decrypted using a key encryption key that is known by the encryption endpoint (I/O module 28) on whose behalf the DEK has been requested. The key server 22 also computes a hash value from the KEYID prior to encrypting the KEYID into the wrapped key, and returns this hash value to the DSS 10 as well. The requesting SP 26 of the data storage system 10 stores the wrapped key and hash value locally, and also forwards the wrapped key to the appropriate I/O module 28, which decrypts the wrapped key and stores the plaintext elements (DEK; KEYID; OBJ) locally for use in performing encrypted storage operations as described more fully below.

At 36, the data storage system 10 receives a storage request from a host 12 via the SAN 14 (which may be either a read or write request). The storage request typically specifies a logical device referred to as a "LUN", a starting address for the transfer, and a length of the transfer. This request is translated into one or more storage commands provided to one or more I/O modules 28 for corresponding target disk(s) 24. This translation may involve a RAID function as generally known in the art. At each I/O module 28 receiving such a storage command, the I/O module 28 translates the storage command into a corresponding storage command sent via one of the links 30 to a specific target disk 24 and target storage object. In the case of a write command, the I/O module encrypts the plaintext data using the DEK of the target storage object and provides the encrypted data as part of the write command to the target disk 24. In the case of a read command, the I/O module decrypts the data obtained from the target disk 24 using the DEK of the target storage object, and provides the decrypted data to the SP 26 for subsequent return to the requesting host 12.

One important aspect of the present disclosure is that encrypted data may persist indefinitely on a disk 24, and thus it is required that the data storage system 10 (in conjunction with the key server 22) maintain the association of each storage object with its corresponding data encryption key indefinitely as well. In the interest of efficiency it may not be desirable that this long-term storage of key information be performed at the level of an individual I/O module 28, although this is the place in the system where the keys are actually used to perform encryption/decryption. In one embodiment, key information is maintained long-term within each SP 26, and each I/O module 28 connected to the SP 26 maintains a local copy of key information that it actively uses. The I/O module 28 may employ volatile memory for this purpose, requiring that the information be restored from the SP 26 in the event of a power cycle, reset, etc. This use of a shadow copy has implications for the correct operation of the system which are the concern of the present disclosure. In particular, there is a risk that the information at the I/O module 28 somehow becomes inconsistent with the information stored at the SP 26, such that if the information at the I/O module 28 is used it results in using the wrong data encryption key to encrypt or decrypt data. Because such an error could be catastrophic for the data involved, the data storage system 10 performs various types of consistency checking as described herein to better ensure that the each I/O module 28 uses only the correct data encryption key for each storage operation.

Figure 3:
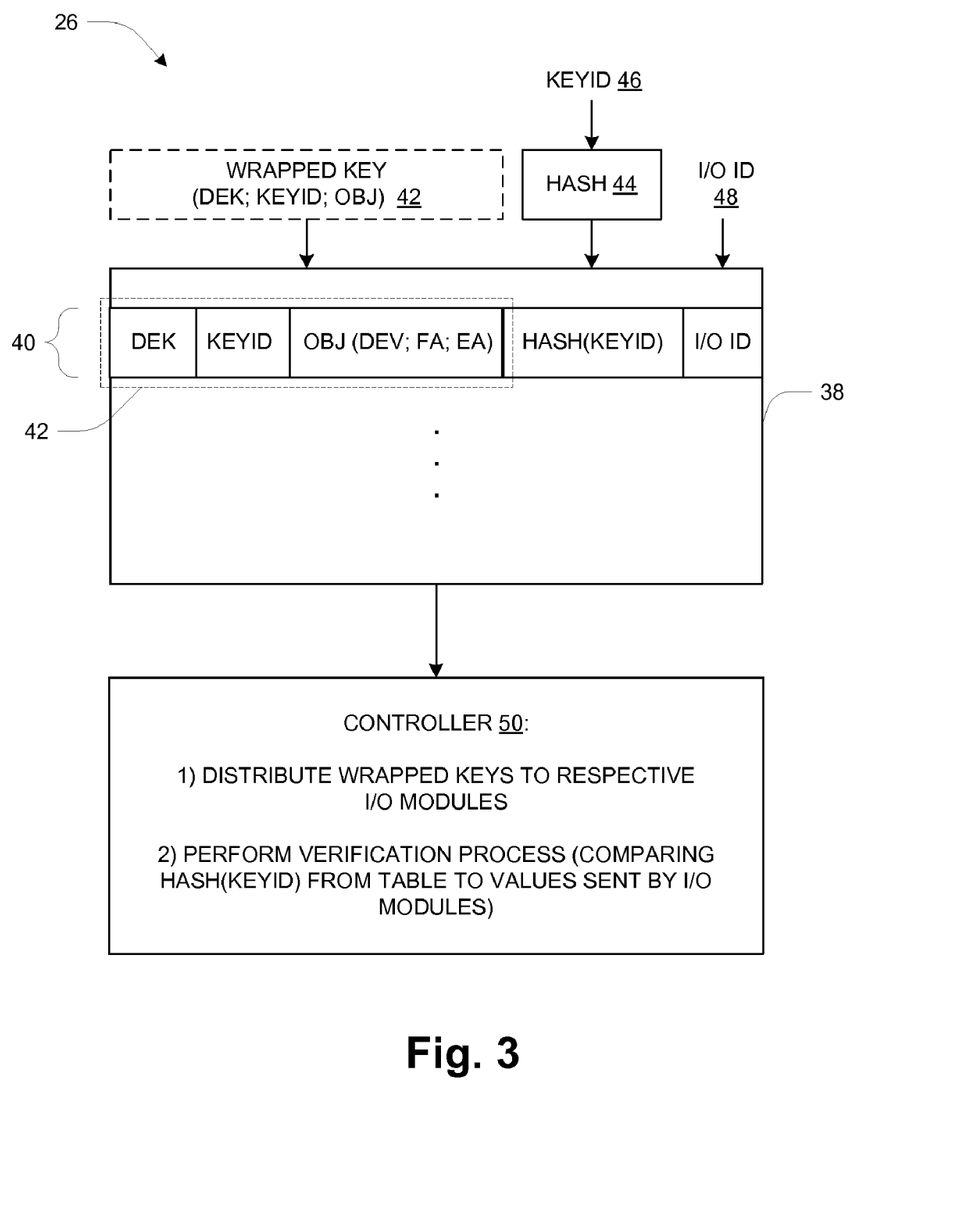
FIG. 3 is a block diagram of a storage processor including a central key table within a data storage system of FIG. 1.

FIG. 3 illustrates certain aspects of an SP 26. The SP 26 includes memory in which the SP 26 maintains a data structure for storing key information, in the illustrated embodiment a key table 38 in which are stored a plurality of key table entries 40. Each entry 40 includes a wrapped key 42 returned from the key server 22; an item shown as HASH(KEYID); and an item shown as I/O ID. The item HASH(KEYID) is a value resulting from applying a hash function 44 to a KEYID 46, which as described above is performed by the key server 22. The I/O ID is a stored version of an identifier I/O ID 48 which identifies the I/O module 28 for which the wrapped key 42 was requested, and will generally be the result of prior configuration. Note that in FIG. 3 the storage object information OBJ is shown as including a storage device identifier DEV and address information including a first address FA and ending address EA which define the bounds of an addressable area of the device DEV. The key table 38 maintains data encryption key information for all I/O modules 28 connected to the SP 26, and thus in that sense is a central key table.

The hash function 44 may be any of a variety of functions that generate a value that is not identical to, but nonetheless is uniquely associated with, the input to the function. It is generally desirable to employ a hash function having security features, such as one of the varieties of secure hashing algorithm (SHA), to avoid exposing any potentially compromising information during a verification process described below.

The SP 26 also includes a processor or controller (CONTROLLER) 50 that, among other things, distributes the wrapped keys 42 from the table 38 to the respective I/O modules 28 and participates in a verification process to ensure that each I/O module 28 is using the correct DEK for encryption/decryption operations for each storage object. In the illustrated embodiment, this verification process involves (1) storing the hash of the KEYID in association with the wrapped key 42 in the entry 40 of the table 38, (2) receiving a value from the I/O module 28 which is the result of the I/O module 28 applying the same hash function to a KEYID contained within a wrapped key 42 that it has received from the SP 26 (described in more detail below), and (3) comparing a hash value obtained from the entry 40 to the value from the I/O module 28 to determine whether they match. If the values match, it establishes that the entry 40 in the table 38 is consistent with a corresponding table entry stored at the I/O module 28 which is used for the encryption/decryption process carried out there. If the values do not match, it indicates that there may an inconsistency between these table entries which could result in the loss of data due to the inability to correctly decrypt encrypted data, as described in more detail below. Thus, if the non-matching condition is detected, it can be to (1) prevent a subsequent encryption or decryption operation involving the storage object represented by OBJ, and (2) activate some higher-level mechanism for investigating the inconsistency and taking some kind of remedial action.

In the above, the hash value obtained from the entry 40 may be the hash value stored as part of the entry 40, or it may be another hash value that is obtained from performing further hash calculations on the stored hash value. The first operation may be used in connection with a single-entry verification process, whereas the second may be used in connection with a full verification process, both of which are described below.

It should be noted that the memory of the SP 26 in which the key table 38 is stored may be volatile. In order to effect the long-term storage of key information as discussed above, the SP 26 may utilize one of the disks 24 as a non-volatile repository. Such techniques are generally known in the art. Additionally, in the event that the key information is somehow lost at the SP 26, it may be possible in some embodiments for the SP 26 to re-create the information from key information maintained at the key server 22. For example, in a typical embodiment the key server 22 may indefinitely maintain a list of all data encryption keys it has produced, each associated with a unique key ID and an associated storage object, and the management station 20 indefinitely maintains configuration information including a listing of storage objects defined in the system. Using such information from the key server 22 and the management station 20, it would be possible to re-build the key information at an SP 26.

Key information may be distributed from the key table 38 to the I/O modules using either a "push" or "pull" model, or combination thereof as appropriate. Here, "push" refers to the action being initiated at the an SP 26, and "pull" refers to an action being initiated at the I/O module. As an example of the latter, an I/O module 28 may request a wrapped key 40 at the time of processing an I/O command directed to the corresponding storage object, upon finding that no local copy of the wrapped key 40 is already stored at the I/O module (i.e., a "cache miss").

Figure 4:
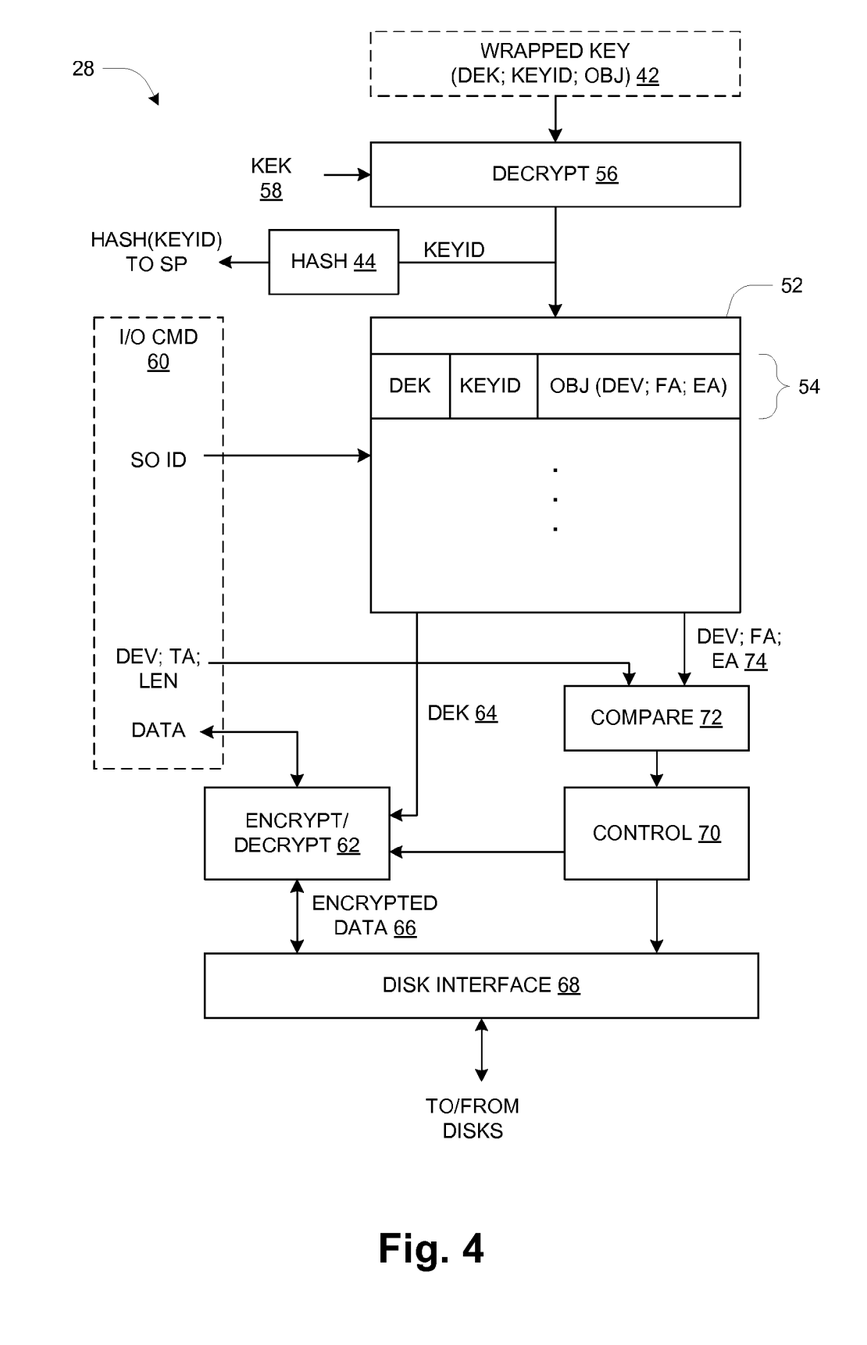
FIG. 4 is a block diagram of an input/output (I/O) module within a data storage system of FIG. 1.

FIG. 4 shows pertinent aspects of an I/O module 28. Each I/O module 28 includes a memory in which it maintains a key data structure for storing key information, in the illustrated embodiment a key table 52 with a plurality of key entries 54. Each entry 54 includes a tuplet consisting of a DEK, the corresponding KEYID, and the corresponding storage object information (OBJ), which as shown includes a device identifier DEV as well as address information including a first address (FA) and ending address (EA) of the storage area on the device. The entries 54 are in plaintext form, having been generated by applying a key decryption function (DECRYPT) 56 to respective wrapped keys 42 received from the SP 26. The decryption function 56 utilizes a key encryption key (KEK) 58 that is obtained from the key server 22 as part of a preceding configuration operation. Note that the decrypted KEYID is provided to the hash function (HASH) 44 to generate the value HASH(KEYID) which is provided to the SP 26 as part of the verification process described above. The key table 52 generally maintains copies of related information also maintained in the central key table 38 of the SP to which the I/O module 28 is connected, and thus in that sense can viewed as a local key table.

Although FIG. 4 shows the hash function 44 being calculated directly from the output of the decryption function 56, it will be appreciated that it may also be calculated from the KEYID of a key entry 54 which is retrieved from the key table 52.

Shown in FIG. 4 is an I/O command 60. This is a data structure created by the SP 26 and passed to the I/O module 28 as part of processing a storage request received from the SAN 14, as generally known in the art. In the illustrated embodiment the I/O command 60 includes several data items including a storage object identifier SO ID and addressing information including a device identifier DEV, a target address TA, and a length value LEN specifying the amount of data to be read from or written to storage. The SO ID is a value created and used within the data storage system to uniquely identify each storage object it knows of. The data DATA is also shown as being part of the I/O command 60, although strictly speaking an I/O command data structure does not normally include the data itself but rather a pointer to a separate memory location at which the data is stored, as is generally known in the art.

The I/O module 28 also includes various elements of processing logic including an encrypter/decrypter (ENCRYPT/DECRYPT) 62 which utilizes the DEK 64 of an entry 54 to convert between the plaintext data of the I/O command 60 and encrypted data 66 which is read from or written to the disks 24 via disk interface logic 68. The encrypter/decrypter 62 and disk interface logic 68 operate under the control of control logic 70 which is responsible for the overall processing of I/O commands by the I/O module 28. Also shown is comparison logic (COMPARE) 72 which operates on addressing information from the I/O command 60 and from a table entry 54. The address information from the table entry 54 is the OBJ data (DEV; FA; EA) 74 forming part of the wrapped key 42. The operation of the comparison logic 72 is described below. The SO ID of the I/O command 60 serves as an index into the table 52, identifying an entry 54 containing the DEK 64 to be used for encrypting/decrypting the data involved in the I/O command 60. It should be noted that in an alternative embodiment the SO ID may be used as a pointer to an index value stored in the memory of the I/O module 28, rather than serving as the index value itself.

The control logic 68 and comparison logic 72 may be embodied in various forms as generally known in the art. In one embodiment these may be software routines executing in a stored-program processor. In another embodiment either or both functions may be implemented in application-specific integrated circuit (ASIC) form, such as field-programmable gate arrays (FPGAs) for example. The encrypter/decrypter 62 is typically hardware-based for high speed/throughput, and the disk interface 68 is typically a specialized integrated circuit tailored for the specific type of communication link 30 interconnecting the I/O module 28 with the disks 24. The encrypter/decrypter 62 may be in its own separate physical package, or it may be included with the disk interface 68.

Figure 5:
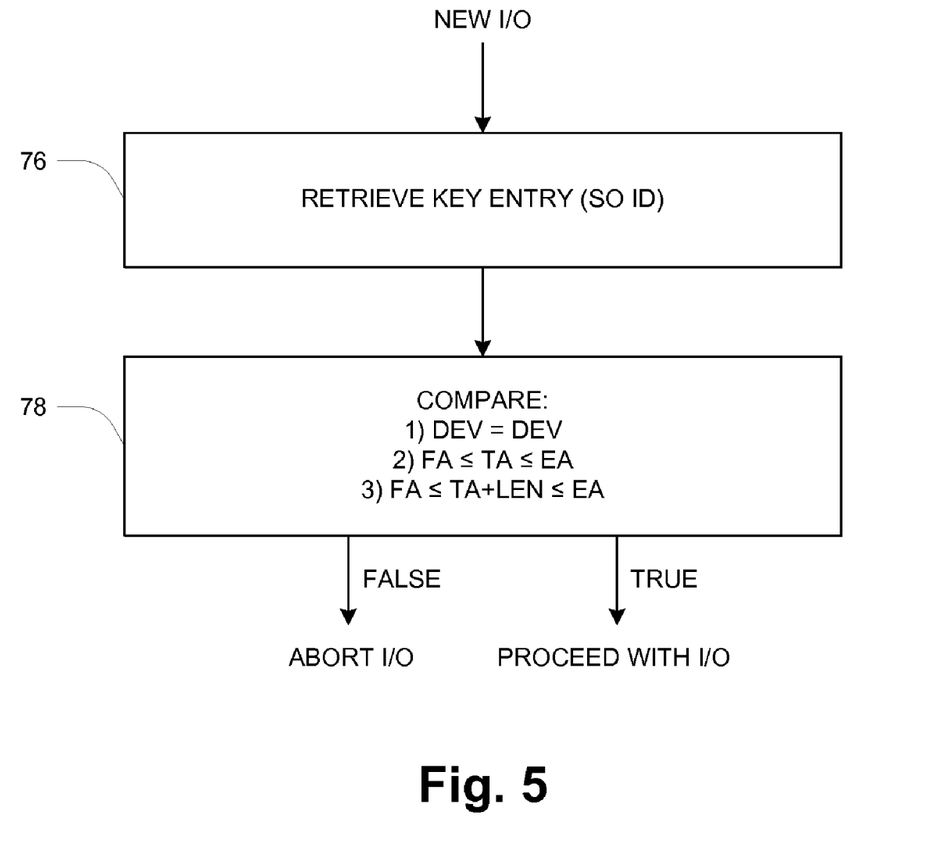
FIG. 5 is a flow diagram depicting a verification process performed in a data storage system of FIG. 1.

FIG. 5 illustrates another verification process, one performed by the I/O module 28 at the time of performing an individual I/O command 60. At 76, the SO ID of the I/O command 60 is used to retrieve an entry 54 from the key table 52. At 78, the comparison logic 72 performs comparisons as follows:

1. Compare DEV from I/O command 60 to DEV from entry 54 to determine if they match.
2. Compare TA from I/O command 60 to both FA and EA from entry 54 to determine if TA is greater or equal to FA and less than or equal to EA.
3. Compare (TA+LEN) from I/O command 60 to both FA and EA from entry 54 to determine if (TA+LEN) is greater or equal to FA and less than or equal to EA.

If the results of the comparisons indicate that the DEV values match and that both TA and (TA+LEN) fall within the values of FA and EA, it indicates that the address information of the I/O command 60 is consistent with the address information of the entry 54 that has been retrieved. This provides greater confidence that the DEK of the retrieved entry 54 is the correct key to use for encrypting or decrypting the data of the I/O command 60. If the results of the comparisons indicate that either the DEV values do not match and/or that one or both of the TA and (TA+LEN) values are outside the bounds defined by FA and EA, this is an indication that the table entry 54 may be inconsistent with the data that was used within the SP 26 to form the I/O command 60. In this situation, it may be quite risky to use the DEK of the retrieved entry 54 to perform encryption/decryption, as the retrieved DEK may in fact be the wrong DEK for the storage object specified in the I/O command 60.

The control logic 70 can use the comparison results from the comparison logic 72 in any of a variety of ways. As shown in FIG. 5, in one embodiment the comparison results are used to decide whether or not the I/O module 28 proceeds with the I/O command 60. If the comparison results are all TRUE, indicating that the retrieved DEK is the correct one to use, then the I/O module 28 proceeds with the I/O command 60, including carrying out encryption/decryption using the retrieved DEK. If the comparison results are FALSE, indicating that the retrieved DEK may not be the correct one to use, then the I/O module 28 aborts the I/O command 60. Additionally, in a typical embodiment the I/O module 28 provides an indication of this error condition back to the SP 26 that generated the I/O command 60, so that appropriate action can be taken at the system level (including providing an indication back to the requesting host 12 as may be required).

Figure 6:
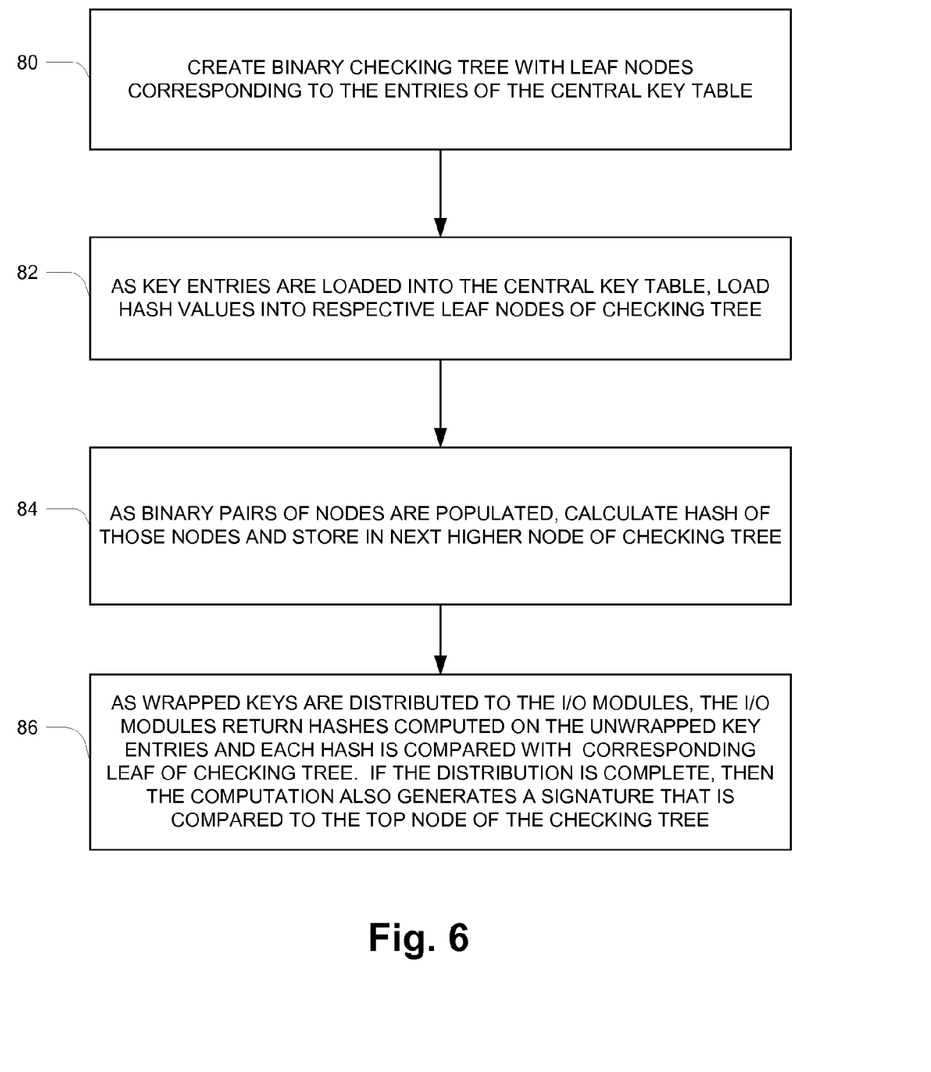
FIG. 6 is a flow diagram depicting another verification process performed in a data storage system of FIG. 1.

FIG. 6 illustrates the verification operation referred to above for ensuring consistency between the central key table 38 and the key tables 52 of the I/O modules 28. Verification may include both a "full" verification procedure as well as a "single-entry" verification procedure as described in more detail below. The full verification may be used relatively infrequently, such as upon initialization or re-loading of the central key table 28, and the single-entry checking may be preferred for checking of individual key entries as they are distributed to the I/O modules 28.

At 80, an SP 26 creates a binary tree, referred to as a binary checking tree, whose leaf nodes correspond to the entries of the central key table 28. At 82, as key entries are loaded into the central key table, the SP 26 takes the hash values of the KEYIDs 46 and loads them into respective leaf nodes of the binary checking tree. At 84, as binary pairs of nodes of the binary checking tree are populated, the SP 26 calculates a hash of the respective hash values of the nodes and stores the hash value in a corresponding next higher node of the binary checking tree. This process is performed at all levels of the tree where possible, such that when the central key table 38 is fully populated, all the nodes of the binary checking tree are also populated with hash values, and there is a single top-level or root hash value that is a hash of the entire contents of the tree.

At 86, as wrapped keys 42 are distributed to the I/O modules 28, the I/O modules return hash values computed on the unwrapped key entries 54 and each hash value is compared with the hash value at a corresponding leaf of the binary checking tree. If the hash values match, then it is confirmed that the respective entries of the central key table and local key table 52 are consistent with each other. If they do not match, it is an indication that the entries are not consistent with each other, and some type of corrective action is necessary before the data encryption key of the affected key entry should be used.

As also indicated at 86, if the distribution of wrapped keys to the I/O module 28 is complete, then the computation may also generate a signature that can be compared to the top node of the checking tree. For incomplete tables, or for the case where the I/O modules 28 do not contain a full copy of the table, the tree will generally be partitioned into one or more sub-trees. If the central key table 38 is depopulated (i.e., entries 40 are removed), then nodes of the checking tree are propagated upwards as necessary to fill in the missing elements.

It may be undesirable to perform the full verification procedure for each key update in a multi-endpoint system that is managing a large number of keys in a runtime environment. For that case, the system can switch to use of the "single-entry" procedure, where the hash of the unwrapped entry 54 and the hash value of the entry 40 are compared directly. In this case it may be desirable to employ the full verification operation as a background process such that the checking trees are computed occasionally to insure correctness.

What is claimed is:

1. A method of performing encrypted data storage operations in a data storage system, comprising:
   generating a plurality of wrapped keys by a key server;
   maintaining a central data structure containing a plurality of wrapped key entries, each wrapped key entry being uniquely associated with a corresponding one of a plurality of encryption endpoints at which the encrypted data storage operations are performed, each wrapped key entry including:
   (A) a wrapped key of the plurality of wrapped keys with data items encrypted together according to a key encryption operation specific to the associated encryption endpoint, the data items of the wrapped key including:
   (i) a data encryption key,
   (ii) storage object information identifying storage data to be encrypted using the data encryption key, and
   (iii) a key identifier uniquely associated with the data encryption key,
   (B) a hash value, the hash value being computed from the key identifier prior to being encrypted together with storage object information and key identifier into the wrapped key, wherein maintaining the central data structure comprises requesting and receiving the wrapped keys from the key server;
   distributing, to each of the encryption endpoints, the wrapped keys of the associated wrapped key entries;
   at each of the encryption endpoints:
   (i) decrypting each of the wrapped keys distributed thereto, the decrypting using the key encryption operation of the encryption endpoint, so as to obtain the data encryption key, the storage object information and the key identifier of each of the wrapped keys in non-encrypted form, and
   (ii) maintaining a local data structure including a plurality of unwrapped key entries each including the data encryption key, the storage object information and the key identifier in non-encrypted form from the corresponding wrapped key, and
   (iii) performing the encrypted data storage operations using the unwrapped key entries; and performing a verification operation including:
- (A) computing a first hash value at each of the encryption endpoints, the first hash value being computed from the respective key identifiers of one or more of the plurality of unwrapped key entries of the local data structure,
- (B) obtaining a plurality of second hash values, each second hash value being obtained from the-respective hash values of one or more of the plurality of wrapped key entries of the central data structure for the associated encryption endpoint, and
- (C) comparing each first hash value to a corresponding one of the plurality of second hash values to determine whether the first hash value matches the corresponding one of the plurality of second hash values.

2. A method according to claim 1, wherein the verification operation is part of a full verification procedure for checking consistency between all the wrapped key entries of the central data structure and respective key entries of the local data structure of each of the encryption endpoints.

3. A method according to claim 2, wherein the full verification procedure is a binary-tree-based procedure including, for each of the encryption endpoints:
- calculating a first binary tree of hash values, the first binary tree of hash values being calculated from the key identifiers of the unwrapped key entries of the local data structure; and
- calculating a second binary tree of hash values, the second binary tree of hash values including leaf nodes whose respective hash values are the hash values of the wrapped key entries of the central data structure associated with the encryption endpoint, the second binary tree of hash values also including branch nodes whose hash values are calculated from the hash values of the leaf nodes;
- and wherein (i) the first hash value is an overall hash value of the first binary tree of hash values, and (ii) the second hash value is an overall hash value of the second binary tree of hash values.

4. A method according to claim 1, wherein:
- the verification operation is part of a single-entry verification procedure for checking consistency between one of the wrapped key entries of the central data structure and one of the unwrapped key entries of the local data structure of one of the encryption endpoints; and
- the first hash value is computed directly from the key identifier of the one unwrapped key entry, and the second hash value is the hash value of the one wrapped key entry of the central data structure.

5. A method according to claim 1, wherein the storage object information includes a storage device identifier and address values collectively identifying an area of storage on a storage device for storing data to be encrypted using the data encryption key.

6. A method according to claim 1, wherein the first hash value is computed from the key identifier of the unwrapped key entry, and the second hash value is computed from the key identifier of the wrapped key entry prior to being wrapped and stored in the central data structure.

7. A method according to claim 1, wherein the hash values are computed using a secure hash function.

8. A method according to claim 1, wherein the verification operation is performed as a condition to permitting use of the data encryption keys of the unwrapped key entries for the encrypted data storage operations.

9. A data storage system, comprising:
- a key server operative to generate a plurality of wrapped keys;
- a storage processor; and
- a plurality of input/output modules,
- the storage processor being operative to:
  - (A) maintain a central data structure containing a plurality of wrapped key entries, each wrapped key entry being uniquely associated with a corresponding one of the input/output modules at which the encrypted data storage operations are performed, each wrapped key entry including:
    - (i) a wrapped key of the plurality of wrapped keys with data items encrypted together according to a key encryption operation specific to the associated input/output modules, the data items of the wrapped key including
      - (a) a data encryption key,
      - (b) storage object information identifying storage data to be encrypted using the data encryption key, and
      - (c) a key identifier uniquely associated with the data encryption key,
    - (ii) a hash value, the hash value being computed from the key identifier prior to being encrypted together with the storage object information and key identifier into the wrapped key, wherein the storage processor is operative as part of maintaining the central data structure to request and receive the wrapped keys from the key server; and
  - (B) distribute to each of the input/output modules the wrapped keys of the associated wrapped key entries; and
- each of the input/output modules being operative to:
  - (A) decrypt each of the wrapped keys distributed thereto, the decrypting using the key encryption operation of the encryption endpoint, so as to obtain the data encryption key, storage object information and key identifier of each of the wrapped keys in non-encrypted form;
  - (B) maintain a local data structure including a plurality of unwrapped key entries each including the data encryption key, storage object information and key identifier in non-encrypted form from the corresponding wrapped key,
  - (C) perform the encrypted data storage operations using the unwrapped key entries; and
  - (D) perform part of a verification operation including:
    - (i) computing a first hash value from each of the unwrapped key entries of the local data structure, and
    - (ii) providing the first hash value to the storage processor;
- the storage processor being further operative to perform part of the verification operation including:
  - (C) receiving the first hash value from each of the input/output modules,
  - (D) obtaining a plurality of second hash values, each second hash value being obtained from the-respective hash values of one or more of the plurality of wrapped key entries of the central data structure, and
  - (E) comparing the first hash value of each unwrapped key entry in the local data structure to the second hash value of the associated wrapped key entry in the central data structure to determine whether the first hash value of each unwrapped key entry in the local data structure matches the second hash value of the associated wrapped key entry in the central data structure.

10. A data storage system according to claim 9, wherein the storage object information includes a storage device identifier and address values collectively identifying an area of storage on a storage device for storing data to be encrypted using the data encryption key.

11. A data storage system according to claim 9, wherein the first hash value is computed from the key identifier of the unwrapped key entry, and the second hash value is computed from a separate copy of the key identifier prior to being wrapped and stored in the central data structure stored at the storage processor.

12. A data storage system according to claim 9, wherein the verification operation is part of a full verification procedure for checking consistency between all the wrapped key entries of the central data structure and respective key entries of the local data structure of each of the I/O modules.

13. A data storage system according to claim 12, wherein the full verification procedure is a binary-tree-based procedure including, for each of the I/O modules:

calculating, at the I/O module, a first binary tree of hash values, the first binary tree of hash values being calculated from the key identifiers of the unwrapped key entries of the local data structure; and calculating, at the storage processor, a second binary tree of hash values, the second binary tree of hash values including leaf nodes whose respective hash values are the hash values of the wrapped key entries of the central data structure associated with the I/O module, the second binary tree of hash values also including branch nodes whose hash values are calculated from the hash values of the leaf nodes;

and wherein (i) the first hash value is an overall hash value of the first binary tree of hash values, and (ii) the second hash value is an overall hash value of the second binary tree of hash values.

14. A data storage system according to claim 9, wherein:

the verification operation is part of a single-entry verification procedure for checking consistency between one of the wrapped key entries of the central data structure and one of the unwrapped key entries of the local data structure of one of the I/O modules; and the first hash value is computed by the I/O module directly from the key identifier of the one unwrapped key entry, and the second hash value is the hash value of the one wrapped key entry of the central data structure.

15. A data storage system according to claim 9, wherein the hash values are computed using a secure hash function.

* * * * *